United States Patent [19]
Nishii et al.

[11] Patent Number: 5,153,437
[45] Date of Patent: Oct. 6, 1992

[54] OPTICAL ENCODER HAVING A TRANSPARENT LENS PLATE WITH AN ARRAY OF LENSES

[75] Inventors: Kanji Nishii, Osaka; Hiroyuki Kawamura, Katano; Masami Ito, Takarazuka; Atsushi Fukui, Hirakata, all of Japan

[73] Assignee: Matsushita Electric Industrial Co., Ltd., Osaka, Japan

[21] Appl. No.: 753,181

[22] Filed: Aug. 30, 1991

[30] Foreign Application Priority Data

Sep. 5, 1990 [JP] Japan .................................. 2-236791

[51] Int. Cl.⁵ .............................................. G01D 5/34
[52] U.S. Cl. ............................ 250/231.14; 250/231.16; 359/210
[58] Field of Search ...................... 250/231.14, 231.16, 250/237 G; 356/374, 375; 359/210; 358/205

[56] References Cited

U.S. PATENT DOCUMENTS 4,987,301  1/1991  Nakamura ...................... 250/231.16
5,073,710 12/1991  Takagi et al. .................. 250/231.14

FOREIGN PATENT DOCUMENTS 1-199115  8/1989  Japan .

Primary Examiner—David C. Nelms
Assistant Examiner—T. Davenport
Attorney, Agent, or Firm—Wenderoth, Lind & Ponack

[57] ABSTRACT

An optical encoder is used for detecting the position, speed, acceleration etc. of a moving or rotating object. The optical encoder includes a light source, a collimator lens for collimating a light emitted from the light source, a transparent lens plate having an array of lenses formed therein at regular intervals, and a light detector located on a focal plane of the lenses lying on the side opposite to the collimator lens with respect to the lens plate.

5 Claims, 5 Drawing Sheets

OPTICAL ENCODER HAVING A TRANSPARENT LENS PLATE WITH AN ARRAY OF LENSES

BACKGROUND OF THE INVENTION

1. Field of the Invention

The present invention relates to an optical encoder for use in detecting the position, speed, acceleration or the like of a moving or rotating object.

2. Description of the Prior Art

Japanese Patent Laid-open Application (unexamined) No. 1-199115 discloses an optical encoder as shown in FIG. 1. This optical encoder comprises a light source 1, a collimator lens 2 for converting a light emitted from the light source 1 into a parallel light, a rotary disc 3 having a plurality of slits formed therein, a fixed mask 4 having two slits formed therein, two light receiving elements 5 for receiving the light emitted from the light source 1, and two waveform shapers 6 for effecting a waveform shaping with respect to respective waveforms sent from the light receiving elements 5.

A light flux emitted from the light source 1 is initially converted into a parallel light by the collimator lens 2. The parallel light is then applied to the rotary disc 3. Part of the parallel light passes through the slits of the rotary disc 3 and those of the fixed mask 4 and is received by the light receiving elements 5. The light received by the light receiving elements 5 is converted into electric energy, which is in turn inputted into the waveform shapers 6 and is outputted therefrom as electric signals.

Upon rotation of the rotary disc 3, the overlapping condition between the slits of the rotary disc 3 and those of the fixed mask 4 gradually changes between the condition in which both of them almost overlap each other and the condition in which there is little overlap between them, as viewed from the light source 1. In compliance with the overlapping condition, the waveform shapers 6 output respective signals each generally in the form of a sine wave. Based on these signals, the rotational position, speed, acceleration or the like can be detected.

In the above-described construction, however, the pitch between the slits of the rotary disc 3 must be extremely narrowed for a detection of high resolving power.

Furthermore, the assembling of these components requires the positioning between the slits of the rotary disc 3 and those of the fixed mask 4 and the positioning between the slits of the fixed mask 4 and the light receiving elements 5. These two positionings require a high accuracy of the components and that for adjustments thereof during the assembling.

In addition, two kinds of slit plates i.e., the rotary disc 3 and the fixed mask 4 are required as an optical modulator. Since the two slit plates must be arranged in the direction axially of the optical encoder, it is difficult to make the encoder thin.

SUMMARY OF THE INVENTION

The present invention has been developed to overcome the above-described disadvantages.

It is accordingly an object of the present invention to provide an improved optical encoder, which is capable of outputting a high density signal indicative of the movement or rotation of an object and has a simple construction in which an optical modulator consists of a single rotating or moving plate.

Another object of the present invention is to provide an optical encoder of the above-described type, which can be made thin in the direction axially thereof and of which adjustments during assembling are simplified.

In accomplishing these and other objects, an optical encoder according to the present invention comprises a light source, collimation means for collimating a light emitted from the light source, a movable or rotatable transparent lens plate having an array of lenses formed therein at regular intervals, and light detector means located on a focal plane of the lenses lying on a side opposite to the collimation means with respect to the lens plate.

In the above-described construction, the parallel light having passed through the lenses is focused on the light detector means whereas the parallel light having passed through the lens plate outside the lenses is applied to the light detector means as a parallel light. Upon movement or rotation of the lens plate, the relative position between the lenses and the light detector means changes, thereby changing the quantity of light received by the light detector means. Based upon changes in the quantity of light received by the light detector means, a periodic signal can be obtained which is higher in density than a pitch of the lenses. This high density periodic signal is useful for detecting the position, speed, acceleration or the like of a moving or rotating object.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
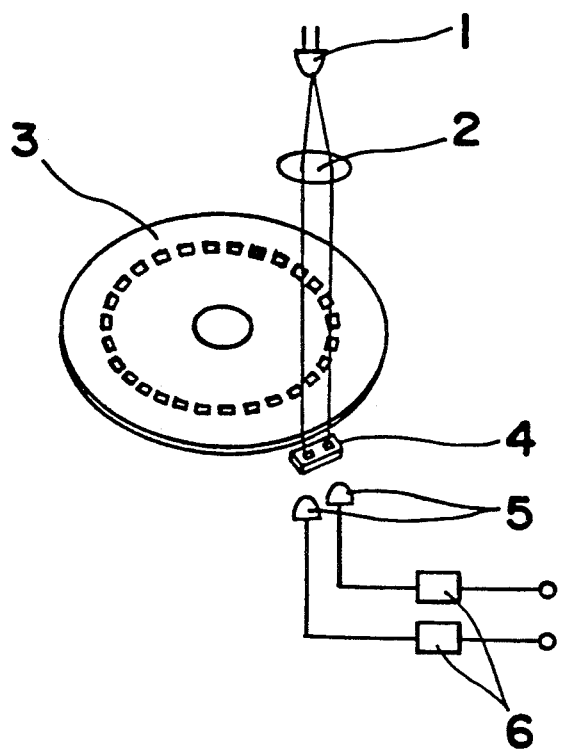
FIG. 1 is a schematic perspective view of a conventional optical encoder.
Figure 2:
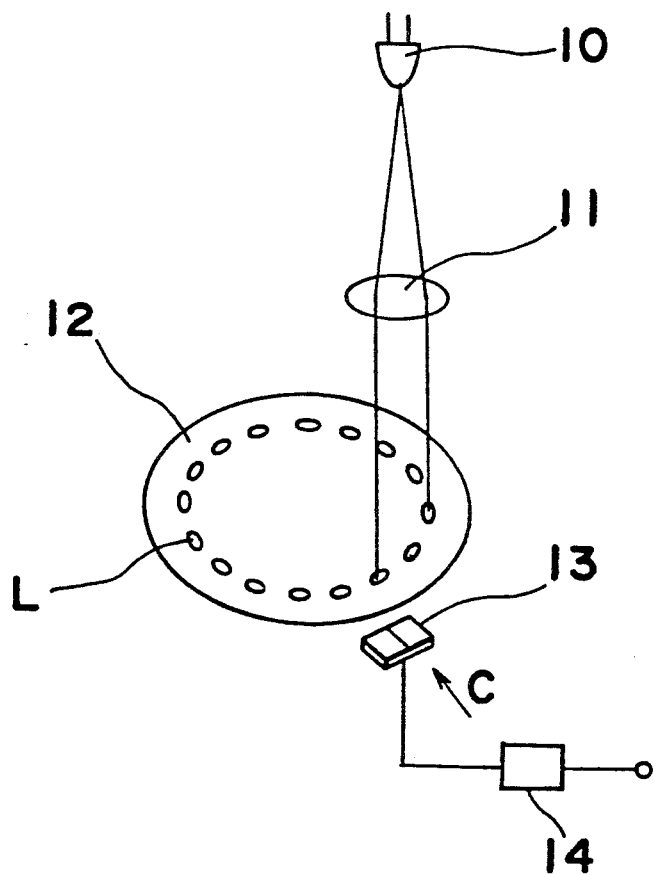
FIG. 2 is a schematic perspective view of an optical encoder according to a first embodiment of the present invention.

Referring now to the drawings, there is shown in FIG. 2 an optical encoder according to a first embodiment of the present invention.

As shown in FIG. 2, the optical encoder comprises a light source 10, a collimator lens 11 for collimating a light emitted from the light source 10 i.e., for converting a light emitted from the light source 10 into a parallel light, and a transparent lens plate 12 having an array of tiny lenses L. The lens plate 12 is made of glass, polycarbonate resin or the like in the form of a disc, and the array of lenses L are formed peripherally thereof at regular intervals. The lens plate 12 is connected to a rotary element (not shown), for example a rotary shaft of an electric motor, and can rotate about its center. The optical encoder further comprises a light detector 13 located on a focal plane of the lenses L lying on the side opposite to the collimator lens 11 with respect to the lens plate and a waveform shaper 14 for effecting a waveform shaping with respect to signals outputted from the light detector 13.

FIGS. 3a to 3e depict changes in relative position between the lenses L of the lens plate 12 and the light detector 13, as viewed from the direction shown by an arrow C in FIG. 2. These changes are caused by the rotation of the lens plate 12.

Figure 3A:
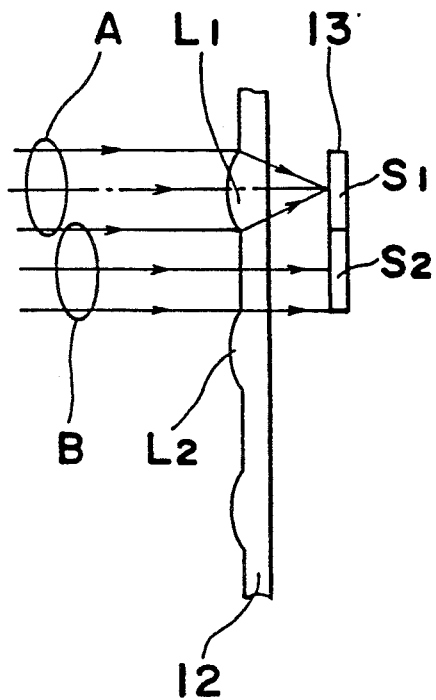
FIGS. 3a to 3e are schematic views indicative of how a light passes through lenses formed on a lens plate as the relative position between the lenses and a light detector gradually changes.
Figure 3B:
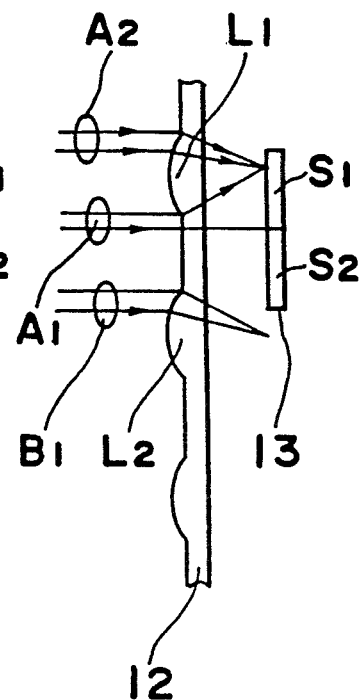
Figure 3C:
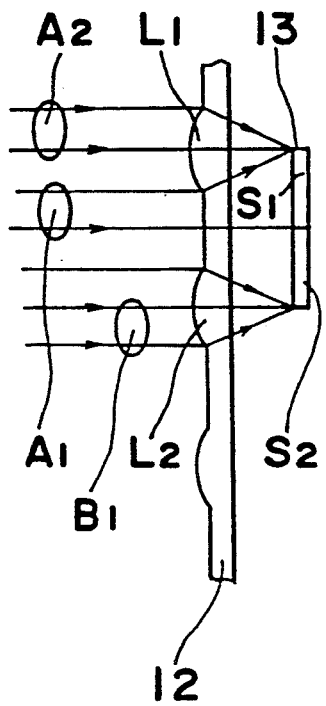
Figure 3D:
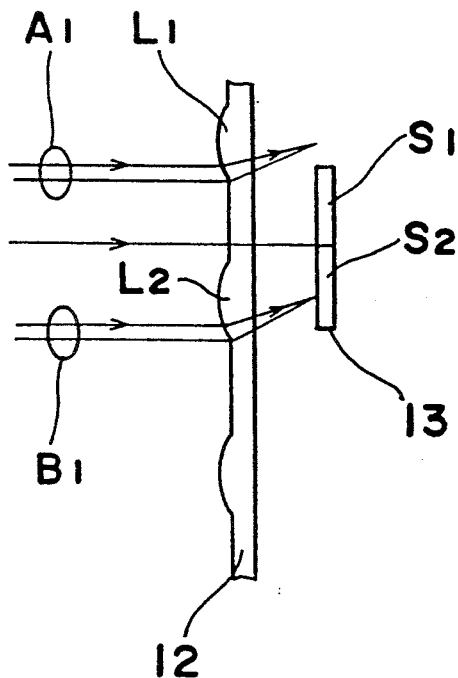
Figure 3E:
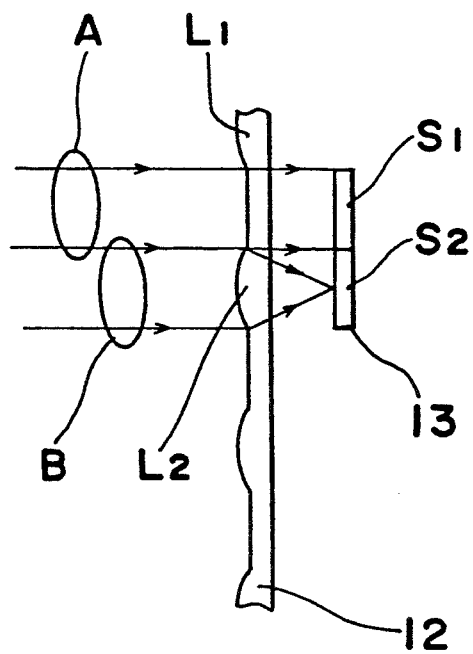
Figure 4A:
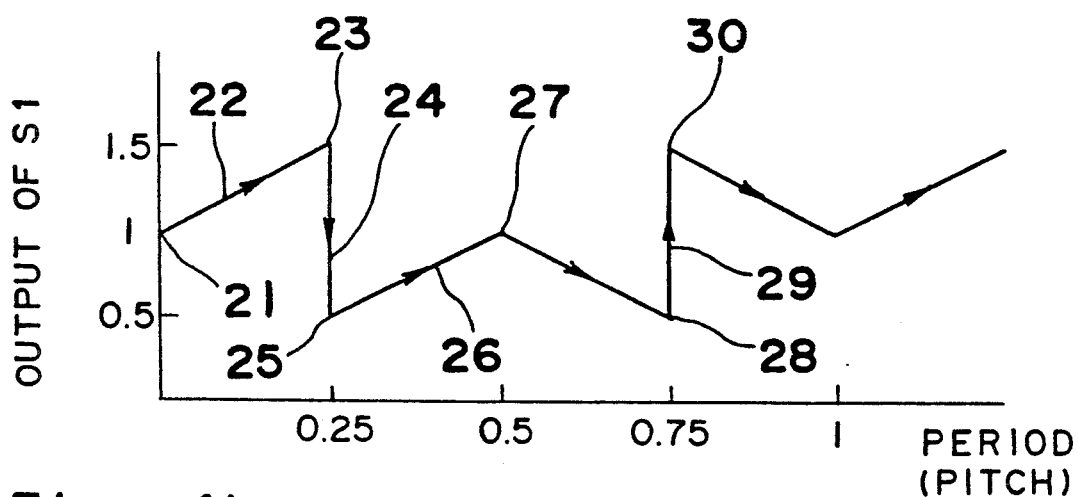
FIGS. 4a and 4b are waveform charts of signals outputted from two independent light detector portions constituting the light detector.
Figure 4B:
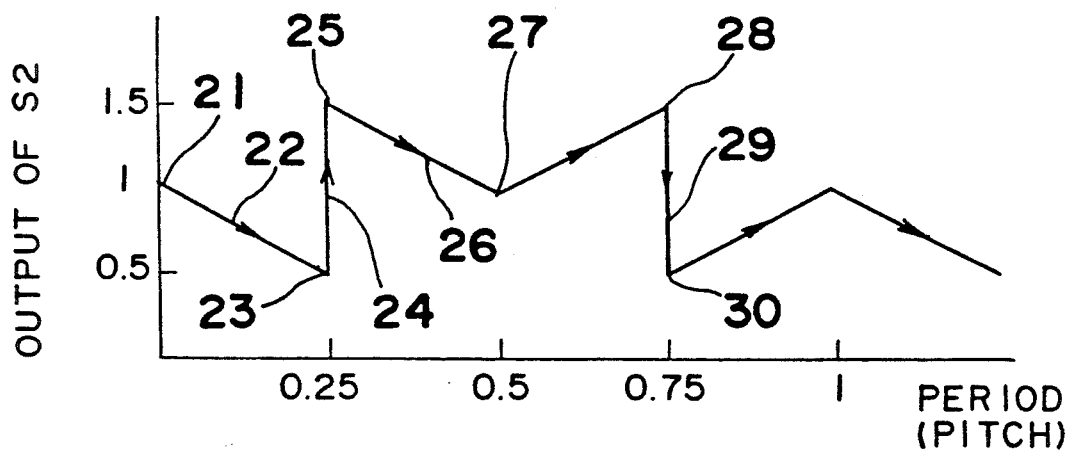

FIGS. 4a and 4b are waveform charts of the signals outputted from the light detector 13 as the relative position between the lenses L and the light detector 13 changes as shown in FIGS. 3a to 3e.

Figure 5:
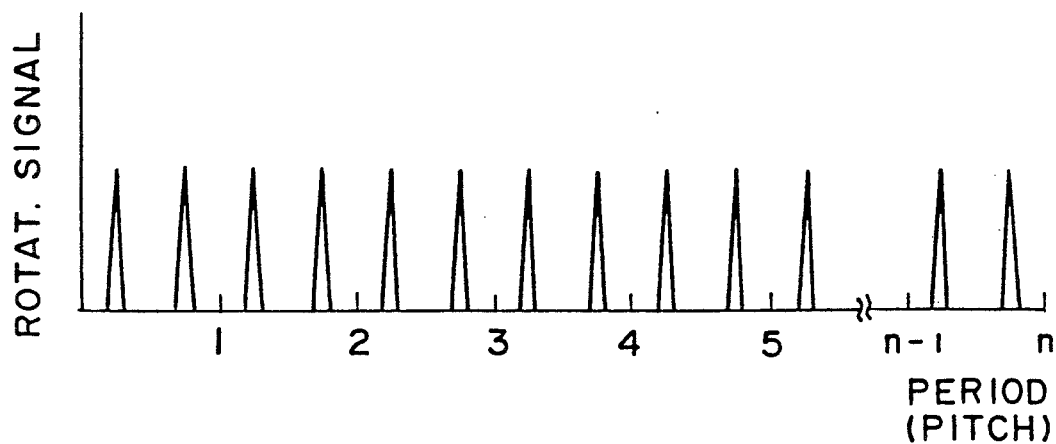
FIG. 5 is a waveform chart of a rotational signal outputted from a signal processing circuit provided in the optical encoder of FIG. 2.

FIG. 5 is a waveform chart of a rotational signal obtained in a shaping processing performed by the waveform shaper 14.

It is to be noted here that the light detector 13 consists of two independent light detector portions S1 and S2 for explanation' sake.

In FIG. 3a, the optical axis of a lens L1 aligns with the center of the detector portion S1 of the light detector 13 whereas the detector portion S2 of the light detector 13 confronts a flat portion between two adjoining lenses L1 and L2.

Light fluxes A and B are directed to the detector portions S1 and S2, respectively. The light flux A is all focused on the detector portion S1 located on a focal plane lying on the side opposite to the collimator lens 11. On the other hand, the light flux B directed to the detector portion S2 is applied thereto as a parallel light flux. Since both the detector portions S1 and S2 have the same area, both of them receive the same quantity of light, and therefore, an output from the detector portion S1 equals to that from the detector portion S2.

Let it be assumed that this condition is a reference condition and the output from each detector portion is rendered to be 1, as shown in FIGS. 4a and 4b.

In FIGS. 4a and 4b, the axis of abscissa represents the amount of changes in relative position between the lens plate 12 and the light detector 13 in terms of the pitch of the lenses L. An amount 0 of changes in relative position means a positional relationship shown in FIG. 3a.

FIG. 3b indicates the condition in which upon rotation of the lens plate 12 from the condition shown in FIG. 3a, the optical axis of the lens L1 deviates one eighth of a pitch from the center of the detector portion S1.

In the case of FIG. 3b, the quantity of light received by the detector portion S1 increases whereas that received by the detector portion S2 reduces, as compared with the case of FIG. 3a indicating the reference condition.

More specifically, of the light flux A, a light flux A1 does not pass through the lens L1 but is received by the detector portion S1 as a parallel light. The remaining light flux of the light flux A exclusive of the light flux A1 passes through the lens L1 and is still focused on the detector portion S1. In other words, the light flux A is all received by the detector portion S1.

On the other hand, a light flux A2 outside the light flux A is collected by the moving lens L1 and focused on the detector portion S1. As a result, the rotation of the lens plate 12 by one eighth of a pitch increases the quantity of light applied to the detector portion S1 by a quantity corresponding to the light flux A2 and increases the output from the detector portion S1.

In contrast, because a light flux B1 of the light flux B passes through the moving lens L2 and is focused on a location outside the detector portion S2, the light flux B1 is not received by the detector portion S2. Accordingly, the output from the detector portion S2 reduces by a quantity corresponding to the light flux B1.

In FIG. 3c, upon further rotation of the lens plate 12, the optical axis of the lens L1 deviates a quarter of a pitch from the center of the detector portion S1.

At the time slightly earlier than the condition shown in FIG. 3c i.e., when the amount of deviation is slightly less than a quarter of a pitch, the optical axis of the lens L1 is still located on the detector portion S1, and therefore, the light which has passed through the lens L1 is entirely focused on the detector portion S1. In other words, in addition to the light flux A, a light flux A2 having a quantity of light corresponding to about half a quantity of the light flux A is focused on the detector portion S1. As a result, the quantity of incident light entering the detector portion S1 becomes about one and a half times greater than that of the reference condition shown in FIG. 3a.

On the other hand, of the light flux B, the light flux B1 having a quantity of light corresponding to about half a quantity of the light flux B is not received by the detector portion S2. Accordingly, the quantity of incident light entering the detector portion S2 becomes about half of the reference condition.

Under such conditions, the outputs from the detector portions S1 and S2 are shown by 23 in the waveform charts of FIGS. 4a and 4b.

Subsequently, at the time slightly later than the condition shown in FIG. 3c i.e., when the amount of deviation is slightly greater than a quarter of a pitch, the optical axis of the lens L1 is no longer located on the detector portion S1, and therefore, the light which has passed through the lens L1 is never received by the detector portion S1. In other words, of the light flux A, the light flux A1 having a quantity of light corresponding to about half a quantity of the light flux A is not received by the detector portion S1.

At this stage, the optical axis of the lens L2 reaches the detector portion S2. As a result, in addition to the light flux B, the light flux B1 having a quantity of light corresponding to about half a quantity of the light flux B is focused on the detector portion S2.

As is apparent from the above, the quantity of light received by each detector portion rapidly changes with a deviation of a quarter of a pitch as a border.

More specifically, the quantity of light received by the detector portion S1 rapidly reduces from about one and a half times to about half the quantity in the reference condition. In contrast, the quantity of light received by the detector portion S2 rapidly increases from about half to about one and a half times the quantity in the reference condition.

Such conditions are shown by 25 in the waveform charts of FIGS. 4a and 4b.

FIG. 3d depicts the condition in which the optical axis of the lens L1 deviates about three eighths of a pitch from the center of the detector portion S1. In this case also, although the output from the detector portion S1 reduces by a quantity of light corresponding to the light flux A1, as compared with the reference condition, the amount of reduction is small as indicated by 26 in the waveform chart of FIG. 4a. On the other hand, although the output from the detector portion S2 increases by a quantity of light corresponding to the light flux B1, as compared with the reference condition, the amount of increase is small as indicated by 26 in the waveform chart of FIG. 4b.

FIG. 3e depicts the condition in which the optical axis of the lens L1 deviates half a pitch from the center of the detector portions S1. This condition corresponds to the condition in which both the detector portions S1 and S2 shown in FIG. 3a are replaced with each other. Accordingly, as indicated by 27 in FIG. 4, the outputs from the two detector portions S1 and S2 are both 1, as in the reference condition.

When the deviation ranges from half a pitch to one pitch, the outputs from both the detector portions S1 and S2 can be readily known by inverting the relationship between them as shown in FIGS. 3a to 3e.

Accordingly, the outputs from both the detector portions S1 and S2 are opposite in phase to each other, as shown in FIGS. 4a and 4b. As a result, it is possible to obtain two periodic signals having a period corresponding to the pitch of the array of lenses L. These periodic signals have each two rising or falling edges within one period i.e., at a quarter and three quarters of one period, as shown in FIGS. 4a and 4b. 24 and 29 indicates such rising or falling edges.

When these edges 24 and 29 of the output signal from either the detector portion S1 or S2 are detected using a conventionally known rising- and falling-edge detector circuit, a rotational signal shown in FIG. 5 can be obtained from the waveform shown in FIG. 4a or 4b.

It is to be noted that in this embodiment, although the light detector 13 consists of two independent light detector portions S1 and S2, a rotational signal can be obtained by the use of a light detector consisting of a single light detector portion. However, the use of a plurality of independent light detector portions is advantageous in that averaging outputs therefrom can enhance the S/N ratio of the rotational signal.

As described above, the optical encoder according to the present invention can produce a high density rotational signal of which pulses appear twice whenever an array of lenses formed on a lens plate at regular intervals move by one pitch.

Figure 6:
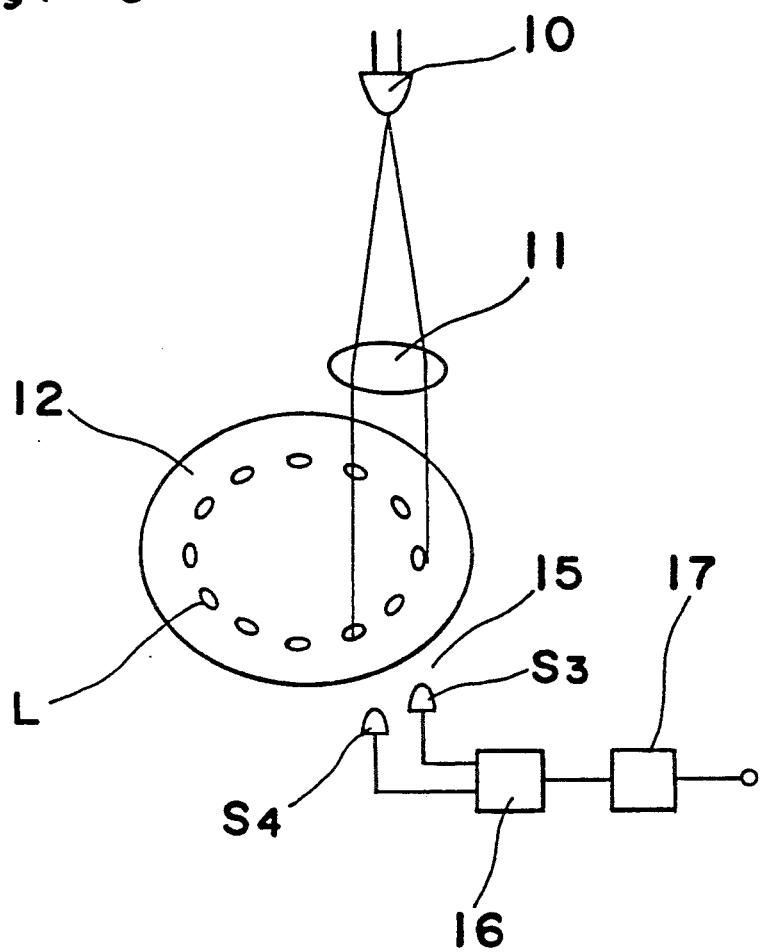
FIG. 6 is a view similar to FIG. 2, according to a second embodiment of the present invention.

FIG. 6 depicts an optical encoder according to a second embodiment of the present invention, which comprises a light source 10, a collimator lens 11 for collimating a light emitted from the light source 10, and a transparent lens plate 12 having an array of tiny lenses L. The lens plate 12 is made of glass, polycarbonate resin or the like in the form of a disc, and the array of lenses L are formed peripherally thereof at regular intervals. The lens plate 12 is connected to a rotary element (not shown), for example a rotary shaft of an electric motor, and can rotate about its center. The optical encoder further comprises a light detector 15 consisting of two independent light detector elements S3 and S4 located on a focal plane of the lenses L lying on the side opposite to the collimator lens 11 with respect to the lens plate 12, a signal combination circuit 16 for combining two signals outputted from the light detector elements S3 and S4, and a threshold processing circuit 17 for effecting a threshold processing with respect to a signal outputted from the signal combination circuit 16.

Figure 7:
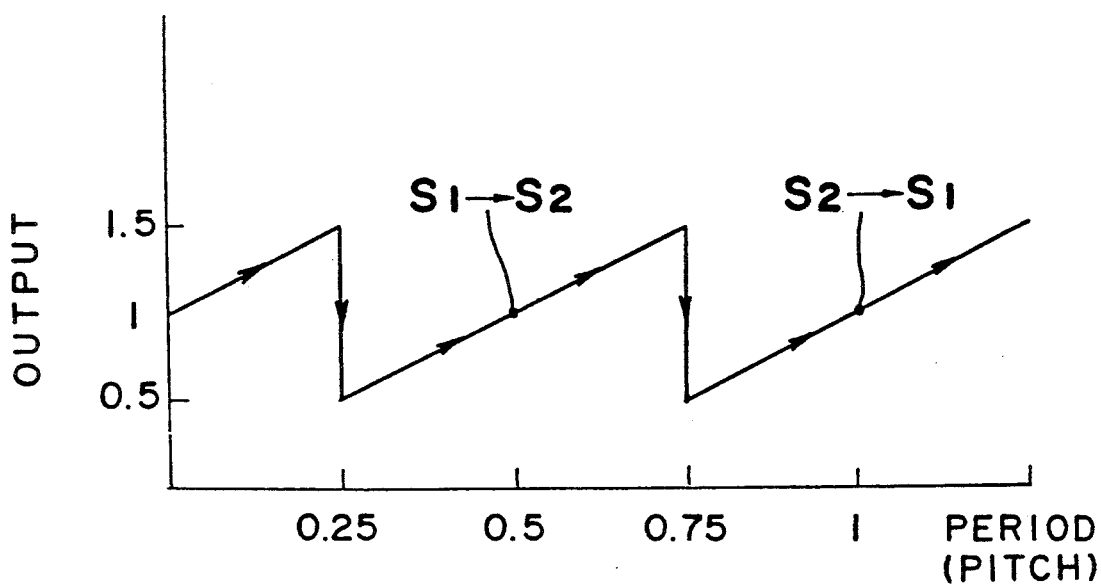
FIG. 7 is a waveform chart of a signal outputted from a signal combination circuit provided in the optical encoder of FIG. 6.
Figure 8:
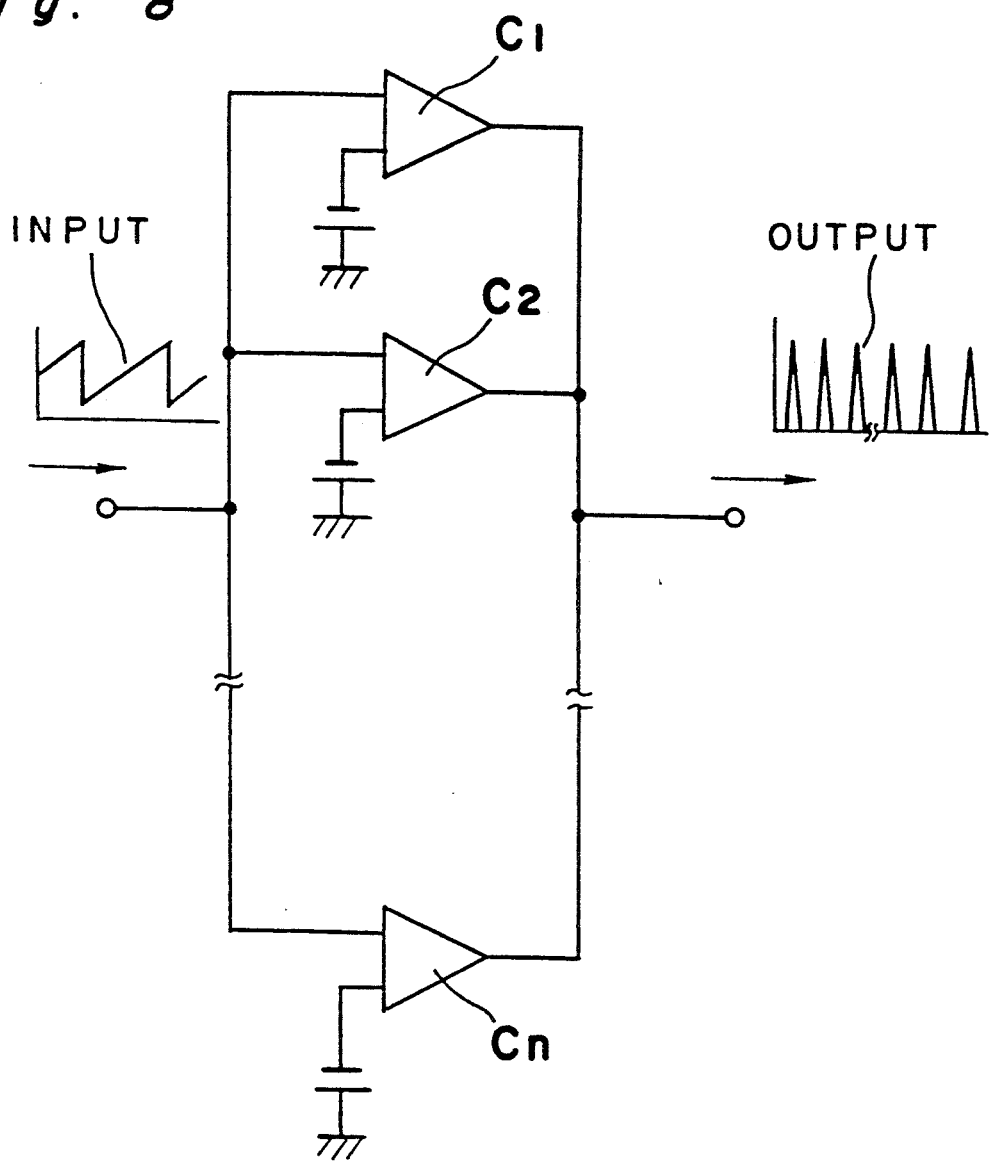
FIG. 8 is a circuit diagram of a threshold processing circuit provided in the optical encoder of FIG. 6.
Figure 9:
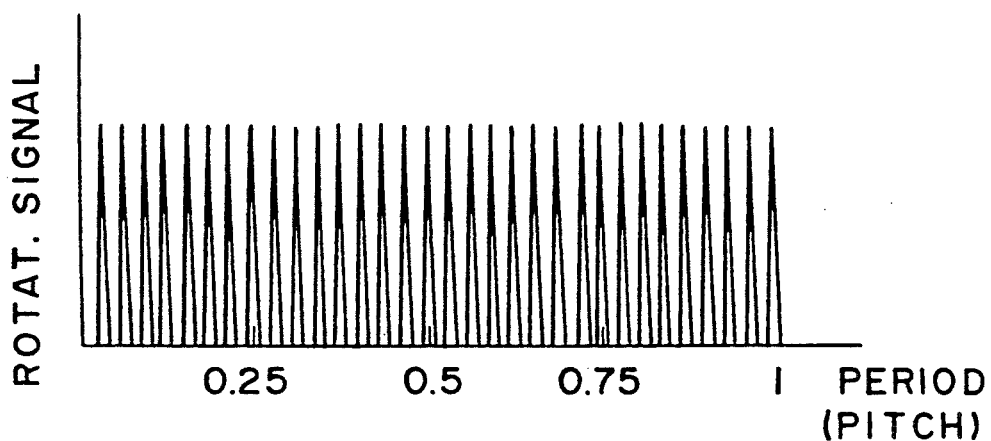
FIG. 9 is a waveform chart of a rotational signal outputted from the threshold processing circuit.

FIGS. 7 and 9 are waveform charts of the signals outputted from the signal combination circuit 16 and the threshold processing circuit 17, respectively. FIG. 8 depicts an example of the threshold processing circuit 17.

Upon rotation of the lens plate 12, the quantity of light received by the light detector elements S3 and S4 changes as shown in FIGS. 4a and 4b, as similar to the first embodiment of the present invention.

The waveform of FIG. 7 is obtained by switching the outputs from the light detector elements S3 and S4 every half a period using the signal combination circuit 16. More specifically, as shown in FIG. 7, the signal combination circuit 16 switches over the output of the light detector element S3 to the output of the light detector element S4 when half a period has elapsed and further switches over the latter to the former when one period has elapsed. The detection of switching timings can be achieved by any known rising- and falling-edge detector circuit. The waveform of a combined signal is in the form of saw teeth, as shown in FIG. 7.

The threshold processing circuit 17 includes a plurality of comparators $C_1$-$C_n$ and produces a rotational signal from the waveform of the combined signal in the form of saw teeth. The comparators $C_1$-$C_n$ have respective reference values for comparison i.e., threshold values, which are obtained by quantizing output values of 0.5-1.5 shown in FIG. 7 into N stages. For example, the comparator $C_1$ has a threshold value corresponding to an output between 0.5 and $(0.5 + 1/N)$.

These comparators $C_1$-$C_n$ are electrically connected in parallel with one another with respect to the input signal. Accordingly, when one cycle of the saw-teeth like waveform, which changes linearly from 0.5 to 1.5, is inputted into the comparators $C_1$-$C_n$, a rotational signal of N pulses is produced as shown in FIG. 9. Accordingly, it is possible to obtain a high density rotational signal of which pulses appear N times whenever the array of lenses L formed on the lens plate 12 at regular intervals move by one pitch.

The optical encoder according to the second embodiment of the present invention is advantageous in that a single lens plate makes it possible to produce a high density signal N/2 times greater in density than that obtained from the optical encoder according to the first embodiment of the present invention.

It is to be noted that although a rotary optical encoder was discussed in the above-described embodiments, the present invention is not limited thereby but is applicable to a linear optical encoder in which an array of lenses are aligned in a line.

As is clear from the above, according to the present invention, since an optical modulator is constituted by a single rotating or moving lens plate having an array of lenses formed therein without requiring both a rotary or linearly movable plate and a fixed disc, it is possible to moderate the accuracy of components and that required for adjustments thereof during assembling. Furthermore, the optical encoder according to the present invention can produce a high density rotational signal and can be made thin.

Although the present invention has been fully described by way of examples with references to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An optical encoder comprising:

a light source;

collimation means for collimating a light emitted from said light source;

a transparent lens plate having an array of lenses formed therein at regular intervals; and light detector means located on a focal plane of said lenses lying on a side opposite to said collimation means with respect to said lens plate.

2. The optical encoder according to claim 1, further comprising signal processing means for processing a signal outputted from said light detector means, thereby producing a rotational signal of which pulses appear twice whenever said array of lenses move by one pitch.

3. The optical encoder according to claim 1, wherein said light detector means comprises two independent light detector elements.

4. The optical encoder according to claim 3, further comprising a signal combination circuit for combining signals outputted from said two light detector elements.

5. The optical encoder according to claim 4, further comprising threshold processing means for effecting a threshold processing with respect to a signal outputted from said signal combination circuit.

* * * * *